United States Patent
Kurosawa et al.

(10) Patent No.: US 9,625,986 B2
(45) Date of Patent: Apr. 18, 2017

(54) SEMICONDUCTOR DEVICE AND TEMPERATURE CONTROL METHOD OF SEMICONDUCTOR DEVICE

(71) Applicant: Kabushiki Kaisha Toshiba, Minato-ku (JP)

(72) Inventors: Yasuhiko Kurosawa, Fujisawa (JP); Shuuji Matsumoto, Sagamihara (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/816,402

(22) Filed: Aug. 3, 2015

(65) Prior Publication Data
US 2016/0266640 A1 Sep. 15, 2016

Related U.S. Application Data

(60) Provisional application No. 62/132,825, filed on Mar. 13, 2015.

(51) Int. Cl.
  G06F 1/26 (2006.01)
  G06F 1/32 (2006.01)
(52) U.S. Cl.
  CPC .......... G06F 1/3296 (2013.01); G06F 1/3206 (2013.01)
(58) Field of Classification Search
  CPC ............................ G06F 1/3206; G06F 1/3296
  USPC .................................................. 713/300, 322
  See application file for complete search history.

(56) References Cited

U.S. PATENT DOCUMENTS

| 6,674,623 | B1 * | 1/2004 | Abe ....................... | G06F 1/206 257/E23.08 |
| 6,889,332 | B2 * | 5/2005 | Helms .................... | G06F 1/206 702/132 |
| 7,464,277 | B2 * | 12/2008 | Prosperi ................. | G06F 1/206 713/300 |
| 7,467,318 | B2 * | 12/2008 | Bruno .................... | G06F 1/206 713/322 |
| 7,822,998 | B2 * | 10/2010 | Cai ........................ | G06F 1/206 713/300 |
| 8,061,895 | B2 | 11/2011 | Tsukude | |
| 2013/0169347 | A1 | 7/2013 | Kim et al. | |
| 2013/0305071 | A1 * | 11/2013 | Nilsen ..................... | H02J 3/14 713/323 |

FOREIGN PATENT DOCUMENTS

| JP | 2009-188016 | 8/2009 |
| JP | 2011-86742 | 4/2011 |
| JP | 2013-140979 | 7/2013 |

\* cited by examiner

Primary Examiner — Mark Connolly
(74) Attorney, Agent, or Firm — Oblon, McClelland, Maier & Neustadt, L.L.P.

(57) ABSTRACT

According to one embodiment, a semiconductor device includes: an integrated circuit that has a plurality of power consumption modes different in power consumption; a temperature detection circuit that detects temperature of the integrated circuit; a counter that measures time taken for temperature change in the integrated circuit; and a state machine that causes a state transition to take place in the integrated circuit based on the temperature detected by the temperature detection circuit and the time measured by the counter, wherein the integrated circuit selects the power consumption mode based on the state subjected to transition by the state machine.

8 Claims, 15 Drawing Sheets

FIG.12

| TEMPERATURE [°C] | REGISTER OUTPUT |
|---|---|
| −127 | 000_0000 |
|  |  |
| −1 | 000_0000 |
| 0 | 000_0000 |
| 1 | 000_0001 |
| 2 | 000_0010 |
| 3 | 000_0011 |
|  |  |
| 25 | 001_1001 |
|  |  |
| 126 | 111_1110 |
| 127 | 111_1111 |

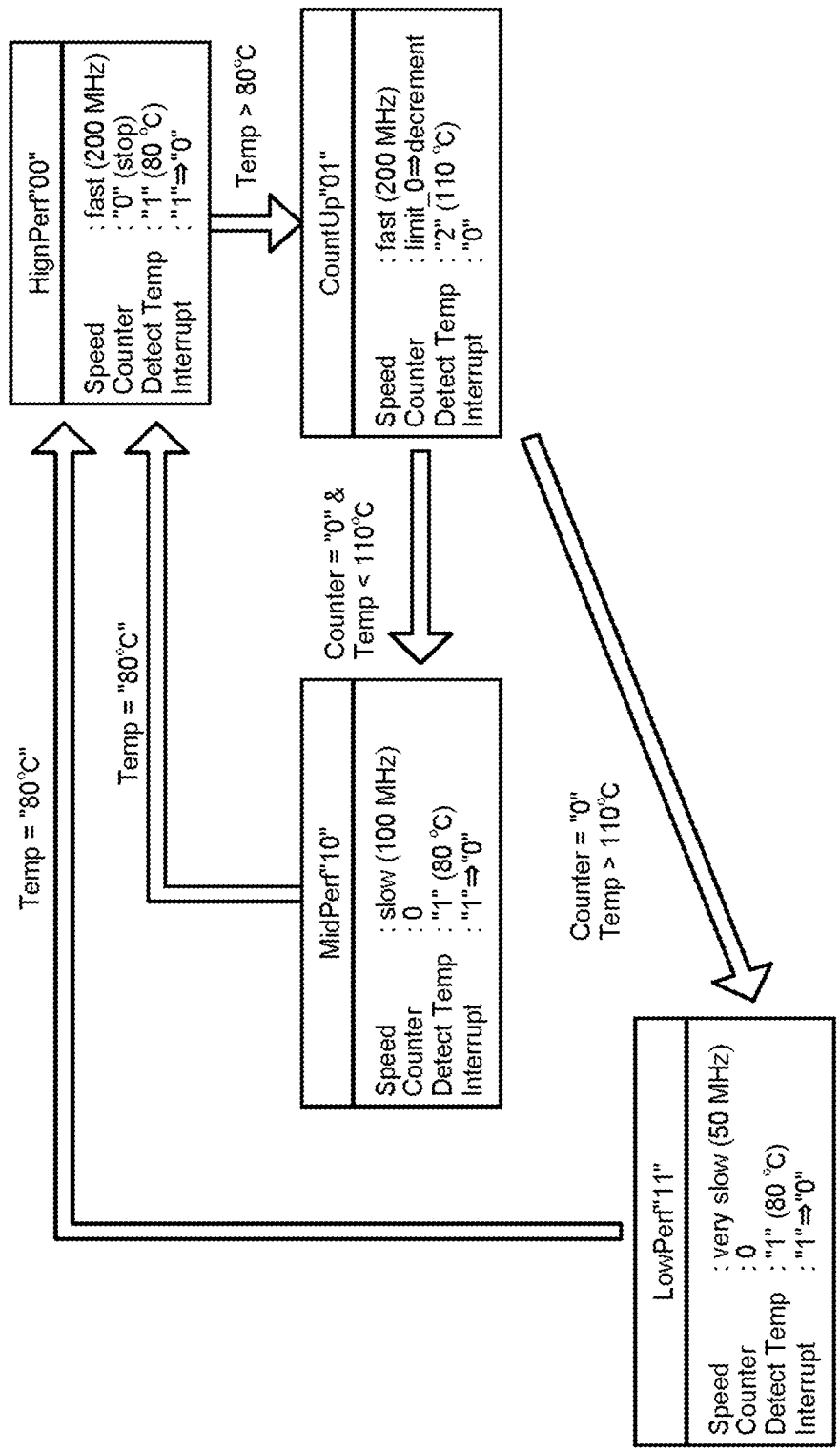

SEMICONDUCTOR DEVICE AND TEMPERATURE CONTROL METHOD OF SEMICONDUCTOR DEVICE

This application is based upon and claims the benefit of priority from U.S. Provisional Application No. 62/132,825, filed on Mar. 13, 2015; the entire contents of which are incorporated herein by reference.

FIELD

Embodiments described herein relate generally to a semiconductor device and a temperature control method of a semiconductor device.

BACKGROUND

As semiconductor devices have been smaller in size and higher in speed, they have significantly been lowered in heat radiation property and subject to increase in amount of heat generation, which results in increase of temperature fluctuations. With such increase of temperature fluctuations, the semiconductor devices may also have had increased variations in performance.

BRIEF DESCRIPTION OF THE DRAWINGS

FIG. 12 is a diagram illustrating the relationship between temperatures and outputs of a temperature detection circuit illustrated in FIG. 11;

FIG. 15 is a diagram illustrating state transitions in a temperature control process of a memory device according to a seventh embodiment.

DETAILED DESCRIPTION

In general, according to one embodiment, a semiconductor device includes: an integrated circuit that has a plurality of power consumption modes different in power consumption; a temperature detection circuit that detects temperature of the integrated circuit; a counter that measures time taken for temperature change in the integrated circuit; a state machine that causes a state transition to take place in the integrated circuit based on the temperature detected by the temperature detection circuit and the time measured by the counter.

Exemplary embodiments of a semiconductor device and a temperature control method of a semiconductor device will be explained below in detail with reference to the accompanying drawings. The present invention is not limited to the following embodiments.

First Embodiment

Figure 1:
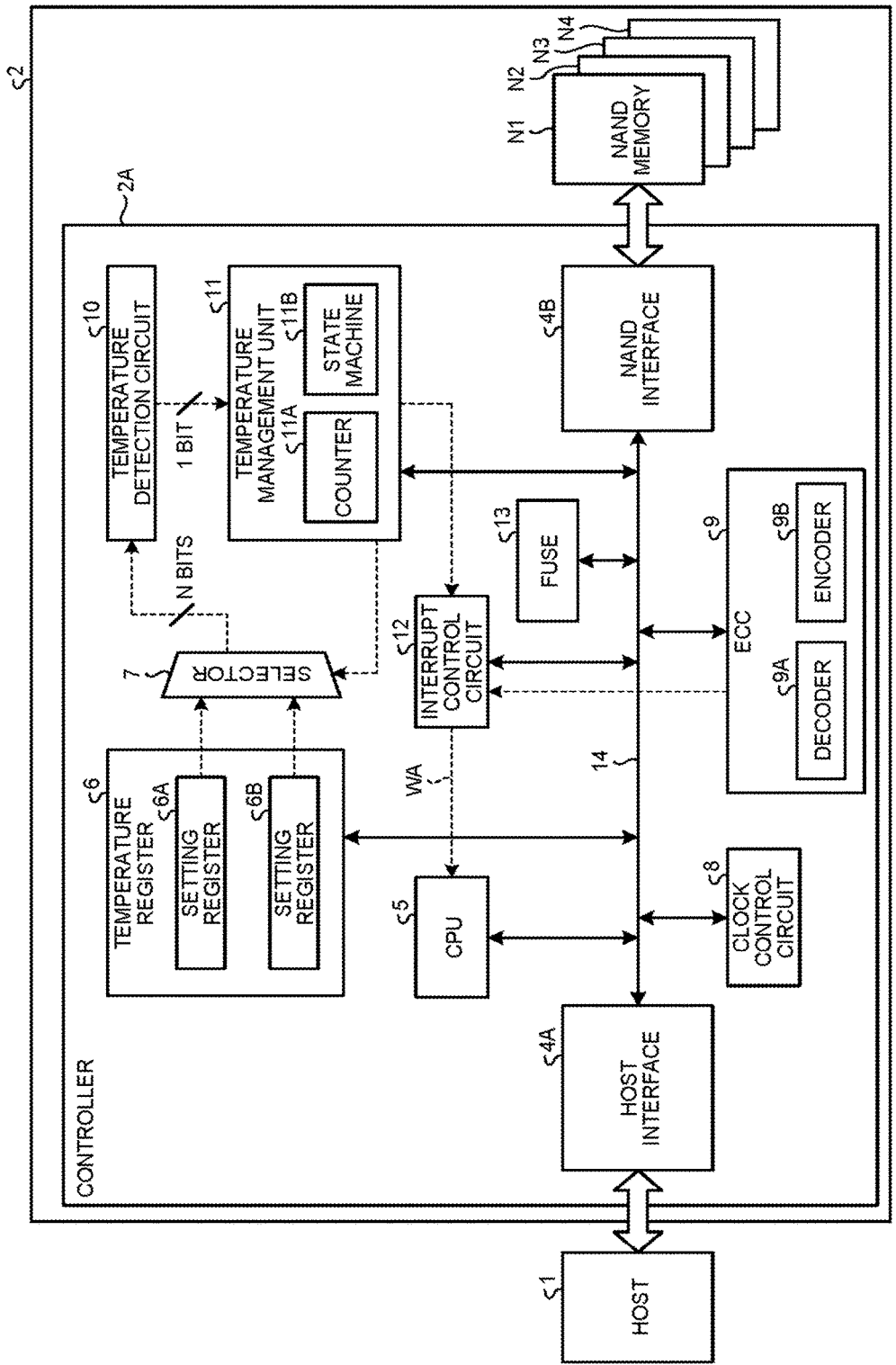
FIG. 1 is a block diagram of a system configuration of a memory device according to a first embodiment.

FIG. 1 is a block diagram of a system configuration of a memory device according to a first embodiment.

Referring to FIG. 1, the system is provided with a host 1 and a memory device 2. The host 1 can write data into the memory device 2 and read data from the memory device 2. The memory device 2 stores data according to requests from the host 1. The memory device 2 is provided with a controller 2A and NAND memories N1 to N4. The controller 2A performs write control and read control on the NAND memories N1 to N4. At that time, the controller 2A may perform block selection, error correction, wear leveling, and the like on the NAND memories N1 to N4. The memory device 2 may be incorporated in a memory card such as an SD card, or a memory module such as eMMC™ or SSD (Solid State Drive), or a memory module in conformity with UFS (Universal Flash Storage) standards. The system into which the memory device 2 is incorporated may be a mobile phone or a smart phone. The memory device 2 may have a plurality of power consumption modes different in amount of power consumption.

The controller 2A is provided with a host interface 4A, an NAND interface 4B, a CPU 5, a temperature register 6, a selector 7, a clock control circuit 8, an ECC circuit 9, a temperature detection circuit 10, a temperature management unit 11, an interrupt control circuit 12, and a fuse 13. The host interface 4A, the NAND interface 4B, the CPU 5, the clock control circuit 8, the ECC circuit 9, the interrupt control circuit 12, and the fuse 13 are connected via a bus 14. The ECC circuit 9 is provided with a decoder 9A and an encoder 9B. The temperature register 6 is provided with setting registers 6A and 6B. The temperature management unit 11 is provided with a counter 11A and a state machine 11B.

The host interface 4A exchanges data with the host 1. The NAND interface 4B exchanges data with the NAND memories N1 to N4. The CPU 5 controls all of operations of components of the controller 2A. The clock control circuit 8 controls clock frequencies of components of the controller 2A. By changing the clock frequencies of components of the controller 2A, the power consumption mode of the memory device 2 can be set. The ECC circuit 9 makes error correction to data written into the NAND memories N1 to N4. The encoder 9B adds parity to data to be written into the NAND memories N1 to N4. The decoder 9A conducts parity check on data read from the NAND memories N1 to N4, and makes error correction if any parity error is detected. The temperature register 6 stores a plurality of preset temperatures. The setting register 6A stores a preset temperature T1. The setting register 6B stores a preset temperature T2 higher than the preset temperature T1. The selector 7 selects the preset temperature T1 or T2 and outputs the same to the temperature detection circuit 10. Each of the preset temperatures T1 and T2 may be set in N (N is an integer of 2 or more) bits, for example, N=7. The temperature detection circuit 10 switches between output levels when the controller 2A has reached the preset temperature. The output level may take one of two values at low and high levels and may be set as a one-bit output. The temperature management unit 11 controls the state of the controller 2A based on the temperature of the controller 2A and the time taken for temperature change in the controller 2A. The counter 11A measures the time taken for temperature change in the controller 2A. In the embodiment, the counter 11A has a 32-bit configuration. The state machine 11B effects a state transition in the controller 2A base on the temperature of the controller 2A and the time taken for temperature change in the controller 2A. The state machine 11B may use a sequencer composed of hardware. For example, when holding the state of 4 or less, the state machine 11B may use a two-bit flip-flop. When holding the state of 5 or more and 8 or less, the state machine 11B may use a three-bit flip-flop. The interrupt control circuit 12 generates an interrupt to the CPU 5. The fuse 13 holds initial values of the preset temperatures T1 and T2.

Figure 2:
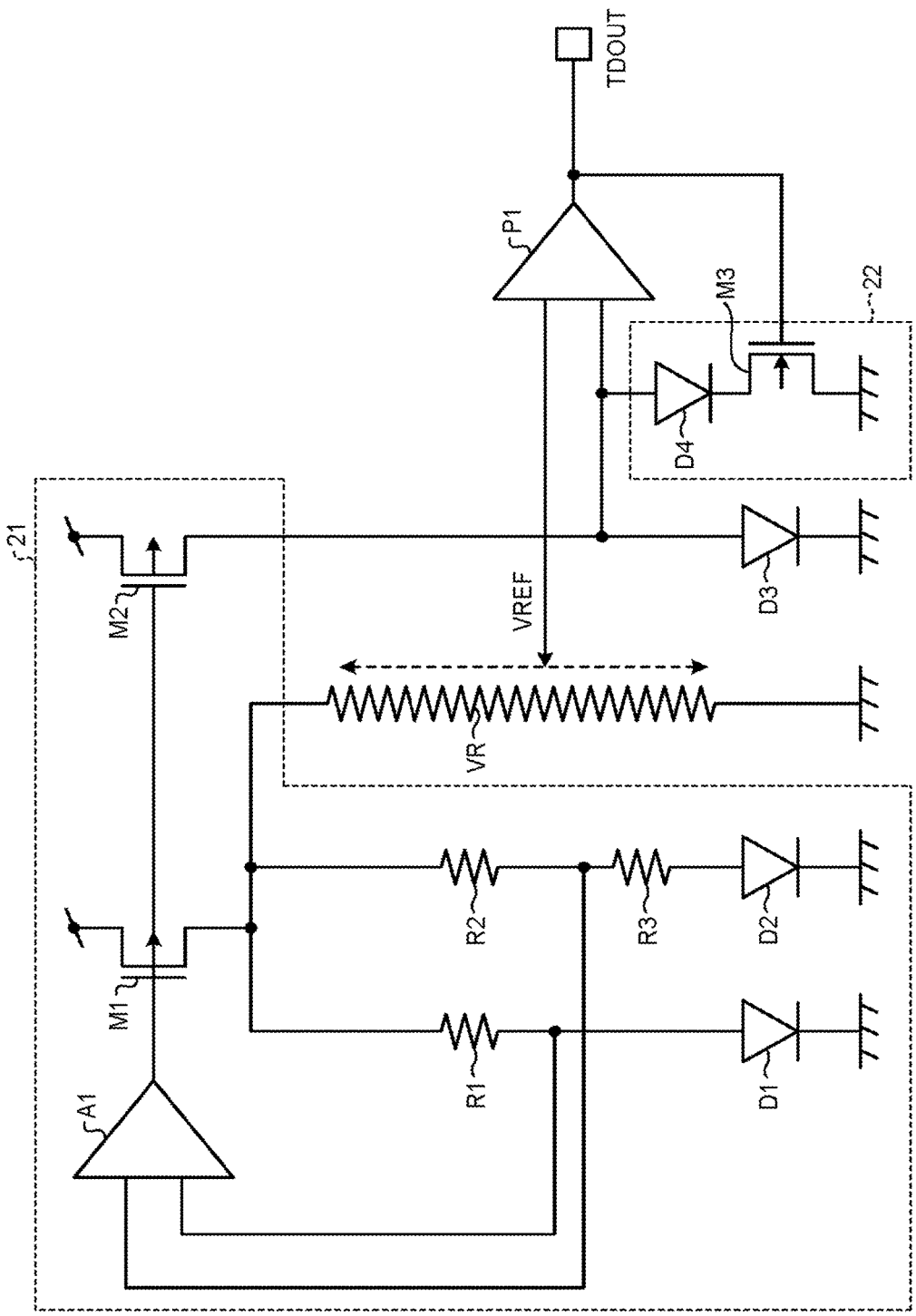
FIG. 2 is a circuit diagram illustrating a configuration example of a temperature detection circuit illustrated in FIG. 1.

FIG. 2 is a circuit diagram illustrating a configuration example of a temperature detection circuit illustrated in FIG. 1. FIG. 2 illustrates a temperature detection circuit with hysteresis as an example. Alternatively, a temperature detection circuit without hysteresis may be used. In the temperature detection circuit with hysteresis, the fuse 13 may use the hysteresis to have only one set of preset values shared between the preset temperatures T1 and T2.

Referring to FIG. 2, the temperature detection circuit 10 is provided with a variable resistor VR setting a reference voltage VREF, a diode D3 having temperature property, and a comparator P1 comparing output of the diode D3 with the reference voltage VREF. The variable resistor VR can change a resistance value to change the reference voltage VREF. The resistance value can be changed based on the preset temperatures T1 and T2. The temperature detection circuit 10 is also provided with a current source 21 setting a reference current and a hysteresis circuit 22 causing hysteresis to the temperature detection circuit 10. The current source 21 is provided with resistors R1 to R3, diodes D1 and D2, transistors M1 and M2, an amplifier A1. The resistor R1 and the diode D1 are connected in series, and a point of connection between the two is connected to a first input terminal of the amplifier A1. The resistors R2, R3 and the diode D2 are sequentially connected in series and a point of connection between the resistors R2 and R3 is connected to a second input terminal of the amplifier A1. Output of the amplifier A1 is connected to gates of the transistors M1 and M2. A series circuit of the resistor R1 and the diode D1, a series circuit of the resistors R2, R3 and the diode D2 and the variable resistor VR are connected in parallel to a drain of the transistor M1. The transistor M2 is connected in series to the diode D3. The hysteresis circuit 22 is provided with a diode D4 and a transistor M3. The diode D4 and the transistor M3 are connected in series, and a series circuit of the two is connected in parallel to the diode D3. Output of the comparator P1 is connected to a gate of the transistor M3.

Then, when electric current is flown from the transistor M1 to the resistors R1 to R3, a voltage corresponding to a voltage drop in the resistor R1 is applied to the first input terminal of the amplifier A1, and a voltage corresponding to a divided voltage divided between the resistors R2 and R3 is applied to the second input terminal of the amplifier A1. Accordingly, an operating point of the amplifier A1 is set according to the values of the resistors R1 to R3 to drive the transistors M1 and M2. Then, the reference voltage VREF is set by flowing electric current from the transistor M1 to the variable resistor VR, and the operating point of the diode D3 is set by flowing electric current from the transistor M2 to the diode D3. Then, the comparator P1 compares the output of the diode D3 with the reference voltage VREF. Output level TDOUT of the comparator P1 is set according to the relationship between the output of the diode D3 and the reference voltage VREF. When the temperature of the diode D3 is low, the output of the diode D3 becomes higher, and when the output of the diode D3 is larger than the reference voltage VREF, the output level TDOUT becomes low. At that time, the transistor M3 is turned off and no electric current is flown to the diode D4. When the temperature of the diode D3 becomes higher and the output of the diode D3 falls below the reference voltage VREF, the output level TDOUT becomes high. At that time, the transistor M3 is turned on and electric current is flown to the diode D4. When electric current is flown to the diode D4, the amount of electric current flown to the diode D3 is decreased by the electric current to the diode D4 to lower the output of the diode D3.

When the temperature of the diode D3 becomes lower while the output level TDOUT is high, the output of the diode D3 becomes higher. When the output of the diode D3 becomes higher than the reference voltage VREF, the output level TDOUT becomes low. When the output level TDOUT is high, the output of the diode D3 is lower than when the output level TDOUT is low. Accordingly, when the output level TDOUT changes from high to low, the output of the diode D3 needs to be more lowered as compared to the case where the output level TDOUT changes from low to high. Therefore, in the case of changing the output level TDOUT when the temperature of the diode D3 changes from a high temperature to a low temperature, the temperature of the diode D3 needs to be more lowered to cause hysteresis to the temperature detection circuit 10, as compared to the case of changing the output level TDOUT when the temperature of the diode D3 changes from a low temperature to a high temperature. Hereinafter, the temperature of the diode D3 at which the output level TDOUT changes when the temperature of the diode D3 changes from a low temperature to a high temperature, may be referred to as detection temperature, and the temperature of the diode D3 at which the output level TDOUT changes when the temperature of the diode D3 changes from a high temperature to a low temperature may be referred to as a release temperature.

The temperature detection circuit 10 has a small parts count and a simple circuit configuration, which allows a shorter design period and a smaller circuit area. The temperature detection circuit 10 is useful for a mobile device such as a memory card.

Figure 3:
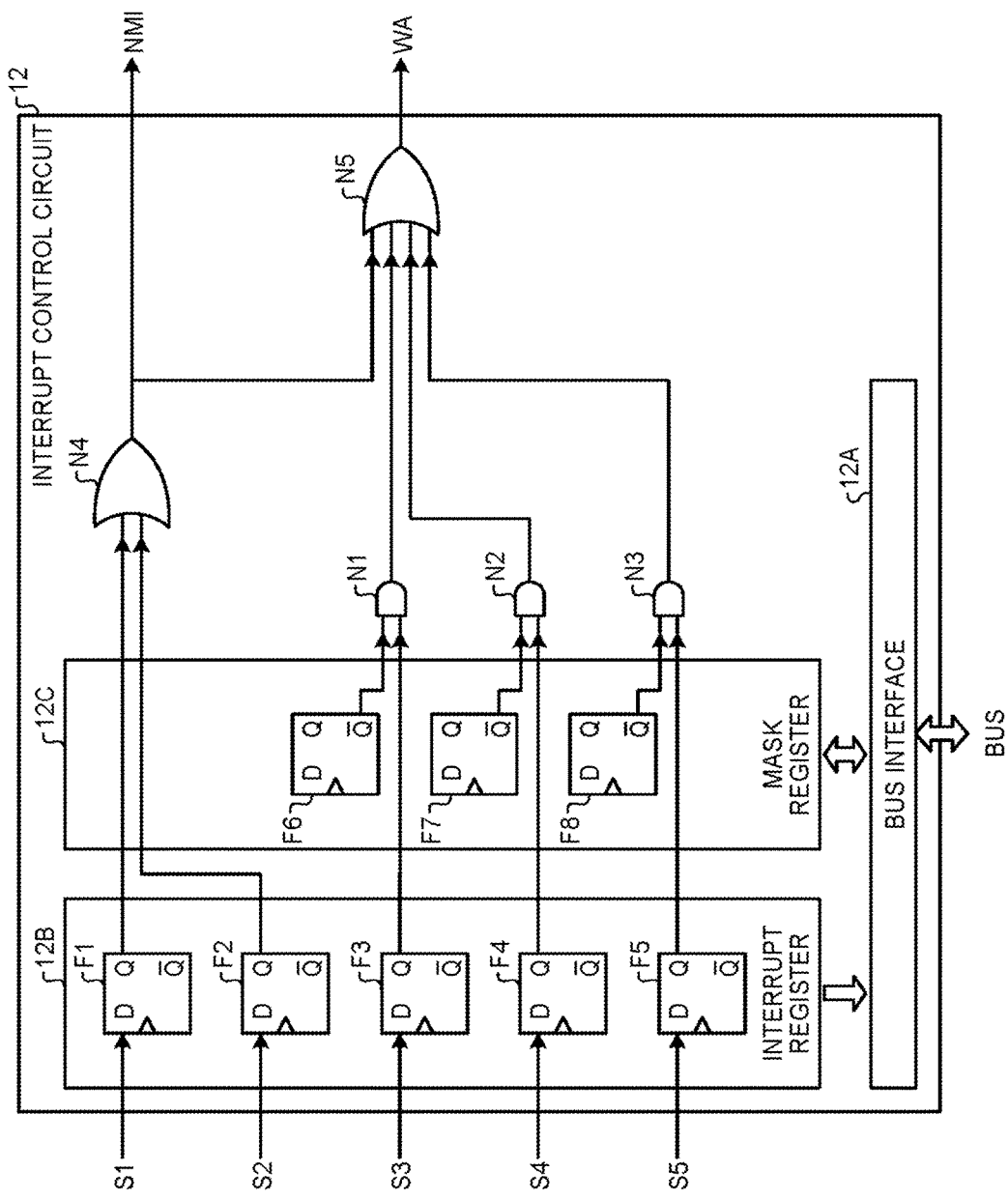
FIG. 3 is a block diagram of a configuration example of an interrupt control circuit illustrated in FIG. 1.

FIG. 3 is a block diagram of a configuration example of an interrupt control circuit illustrated in FIG. 1.

Referring to FIG. 3, the interrupt control circuit 12 is provided with a bus interface 12A, an interrupt register 12B, a mask register 12C, AND circuits N1 to N3, and OR circuits N4 and N5. The interrupt register 12P is provided with flip-flops F1 to F5. The mask register 12C is provided with flip-flops F6 to F8. Outputs of the flip-flops F1 and F2 are connected to an input of the OR circuit N4. Outputs of the flip-flops F3 and F6 are connected to an input of the AND circuit N1. Outputs of the flip-flops F4 and F7 are connected to an input of the AND circuit N2. Outputs of the flip-flops F5 and F8 are connected to an input of the AND circuit N3. Outputs of the AND circuits N1 to N3 and the OR circuit N4 are connected to an input of the OR circuit N5. Interrupt inputs S1 and S2 are input into the flip-flops F1 and F2, respectively. The interrupt inputs S1 and S2 can be generated when an abnormal temperature is detected by a dedicated temperature sensor for detection of 125° C. or higher temperatures or when a power source failure occurs, for example. Interrupt inputs S3 to S5 are input into the flip-flops F3 to F5, respectively. The interrupt inputs S3 to S5 may be generated at the occurrence of an NAND status error, an NAND timeout, or the like. The interrupt inputs S3 to S5 can also be used as interrupt inputs from the state machine 11B illustrated in FIG. 1.

The interrupt inputs S1 and S2 are held by the flip-flops F1 and F2, respectively, and a mask prohibition interrupt signal, or aka non maskable interrupt NMI is output to the CPU 5 via the OR circuit N4. No configuration may be set for the mask prohibition interrupt signal NMI.

The interrupt inputs S3 to S5 are held by the flip-flops F3 to F5, respectively. Then, according to the values of the flip-flops F6 to F8, the interrupt inputs S3 to S5 are masked. The interrupt inputs S3 to S5 not masked are input from the flip-flops F6 to F8 into the OR circuit N5 via the AND circuits N1 to N3. Then, the interrupt inputs S3 to S5 input into the OR circuit N5 are output as an interrupt signal WA to the CPU 5.

In the example of FIG. 3, the interrupt inputs S1 to S5 are received by one column of flip-flops F1 to F5, respectively. Alternatively, when synchronized signals are to be input, the signals may be received by multiple columns of flip-flops. In addition, in the example of FIG. 3, the interrupt inputs S1 to S5 are operated in a level-based manner on the assumption that the interrupt inputs S1 to S5 are held at a high level until a cause of interrupt is eliminated. Alternatively, the interrupt inputs S1 to S5 may be provided in pulses such that, once a pulse is input, a cause of interrupt is retained. The cause of interrupt may be read from the bus 14 via the bus interface 12A.

Upon receipt of a notification of the interrupt signal WA or the mask prohibition interrupt signal Non Maskable Interrupt (hereinafter, abbreviated to as NMI), the CPU 5 stops execution of the program. Then, the CPU 5 saves a context for execution of the program and activates an interrupt handler to identify the cause of interrupt and eliminate the same.

Figure 4:
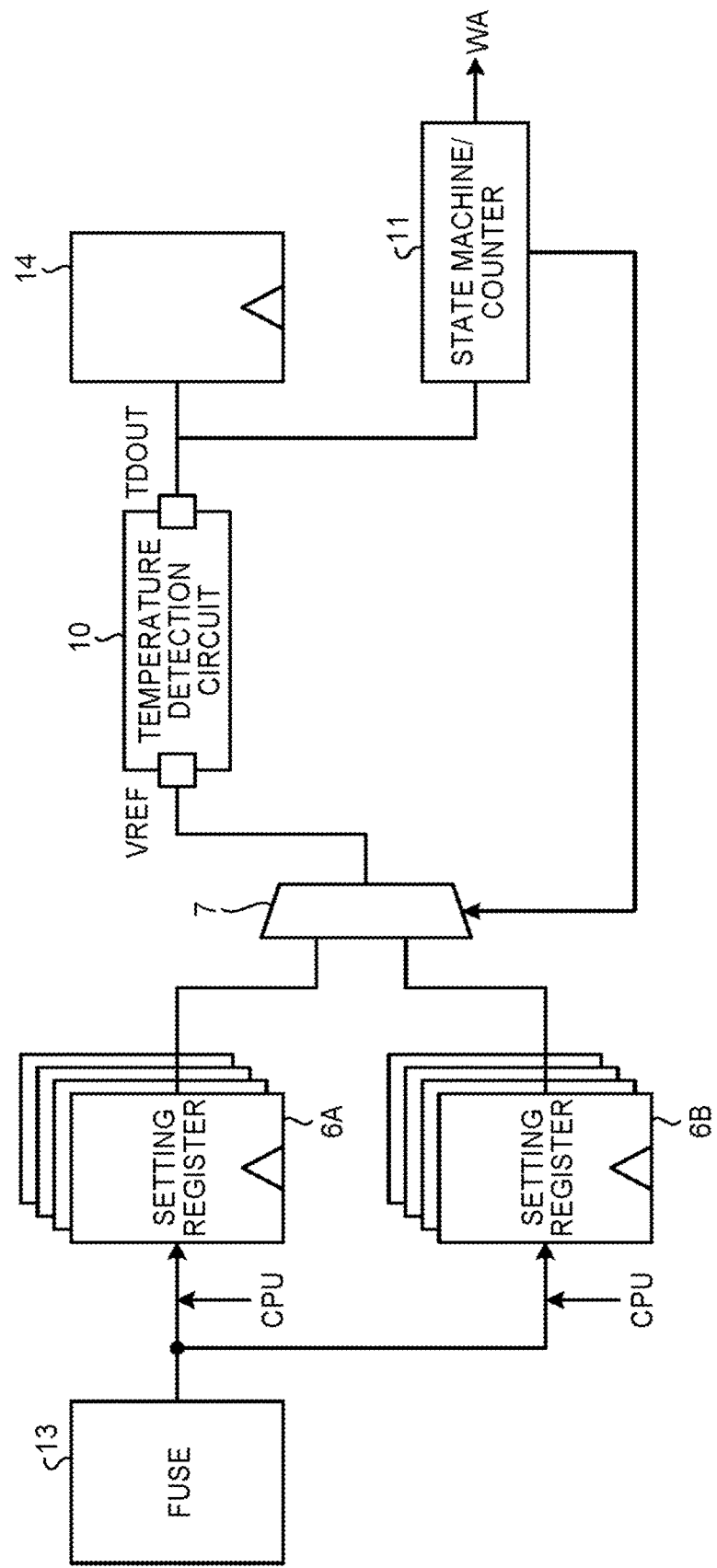
FIG. 4 is a block diagram of a portion related to temperature control of the memory device illustrated in FIG. 1.

FIG. 4 is a block diagram of a portion related to temperature control of the memory device illustrated in FIG. 1. In the example described in FIG. 4, the memory device 2 can operate in three modes, that is, a high-power consumption mode, a mid-power consumption mode, and a low-power consumption mode. In addition, in the example of FIG. 4, the memory device 2 can enter four states, a first state to a fourth state.

Referring to FIG. 4, at the time of power-on, the preset temperatures T1 and T2 are read from the fuse 13 and assigned to the setting registers 6A and 6B, respectively. Then, when the preset temperature T1 is selected by the selector 7 and the resistance value of the variable resistor VR is changed according to the preset temperature T1, the reference voltage VREF is set according to the preset temperature T1. In addition, at the time of power-on, the high-power consumption mode is set such that the memory device 2 operates with the maximum power consumption.

Then, when the temperature of the memory device 2 rises and reaches the preset temperature T1 or higher, the output level TDOUT of the temperature detection circuit 10 switches from low to high levels. The switching is notified to the state machine 11B and the counter 11A starts count-up. The output level TDOUT is held in the flip-flop 14. At that time, the state machine 11B effects state transition of the memory device 2 from the first state to the second state. In addition, when the selector 7 selects the preset temperature T2 and the resistance value of the variable resistor VR is changed according to the preset temperature T2, the reference voltage VREF is set according to the preset temperature T2. At that time, the output level TDOUT of the temperature detection circuit 10 switches from high to low levels. Then, when the temperature of the memory device 2 further rises and reaches the preset temperature T2 or higher, the output level TDOUT of the temperature detection circuit 10 switches from low to high levels. The switching is notified to the counter 11A which stops the count-up. Then, when the value of the counter 11A is equal to or more than a predetermined value at that time, the state machine 11B determines that the temperature rise of the memory device 2 is less steep, and effects state transition of the memory device 2 from the second state to the third state. The state machine 11B also outputs the interrupt signal WA to the CPU 5. Then, the CPU 5 accesses the state machine 11B to make reference to the state of the memory device 2, and the memory device 2 is shifted from the high-power consumption mode to the mid-power consumption mode.

On the other hand, when the value of the counter 11A is smaller than the predetermined value, the state machine 11B determines that the temperature rise of the memory device 2 is steep, and effects state transition of the memory device 2 from the second state to the fourth state. The state machine 11B sends an interrupt input to the interrupt control circuit 12. The interrupt control circuit 12 generates the interrupt signal WA corresponding to the interrupt input from the state machine 11B and outputs the same to the CPU 5. Then, upon receipt of the interrupt signal WA, the CPU 5 accesses the state machine 11B to make reference to the state of the memory device 2, and shifts the memory device 2 from the high-power consumption mode to the low-power consumption mode.

By providing the counter 11A measuring time and the state machine 11B effecting state transition, and placing firmware of the CPU 5 in charge of performing processes related to changes in power consumption mode, it is possible to reduce variations in performance of the memory device 2 due to temperature fluctuations while suppressing complexity of circuit configuration. In addition, by setting the power consumption mode of the memory device 2 with reference to not only the temperature of the memory device 2 but also the rate of temperature change, it is possible to improve temperature stability of the memory device 2 to stabilize performance of the memory device 2.

In the method described above, in order to allow the CPU 5 to change the power consumption mode of the memory device 2, the CPU 5, upon receipt of the interrupt signal WA, the CPU 5 may go to see the value of the counter 11A and determine the power consumption mode from the value of the counter 11A. Also alternatively, in order to allow the CPU 5 to change the power consumption mode of the memory device 2, the CPU 5 may instruct the state machine 11B to send another interrupt signal WA according to the transition state of the memory device 2.

In addition, upon receipt of the interrupt signal WA, the CPU 5 may determine the transitory state of temperature of the memory device 2, and update the preset temperatures T1 and T2 of the setting registers 6A and 6B to relieve temperature fluctuations of the memory device 2.

The determination on whether the value of the counter 11A is equal to or more than or less than the predetermined value may be conducted by hardware processing of the temperature management unit 11 or software processing of the CPU 5. When the determination is to be conducted by hardware processing of the temperature management unit 11, a dedicated comparison circuit may be provided to compare the value of the counter 11A with the predetermined value. Then, the temperature management unit 11 notifies the comparison result from the comparison circuit to the state machine 11B to effect state transition of the memory device 2. When the determination is to be conducted by software processing of the CPU 5, the CPU 5 gives from a program a predetermined value to be compared with the value of the counter 11A. Then, upon receipt of the interrupt signal WA, the CPU 5 can read the value of the counter 11A and compare the value of the counter 11A with the predetermined value. Then, the CPU 5 can notify the comparison result to the state machine 11B to effect state transition of the memory device 2. By placing the firmware in the CPU 5 in charge of determining whether the value of the counter 11A is equal to or more than or less than the predetermined value, it is possible to reduce variations in performance of the memory device 2 due to temperature fluctuations while suppressing increase of circuit scale.

Figure 5:
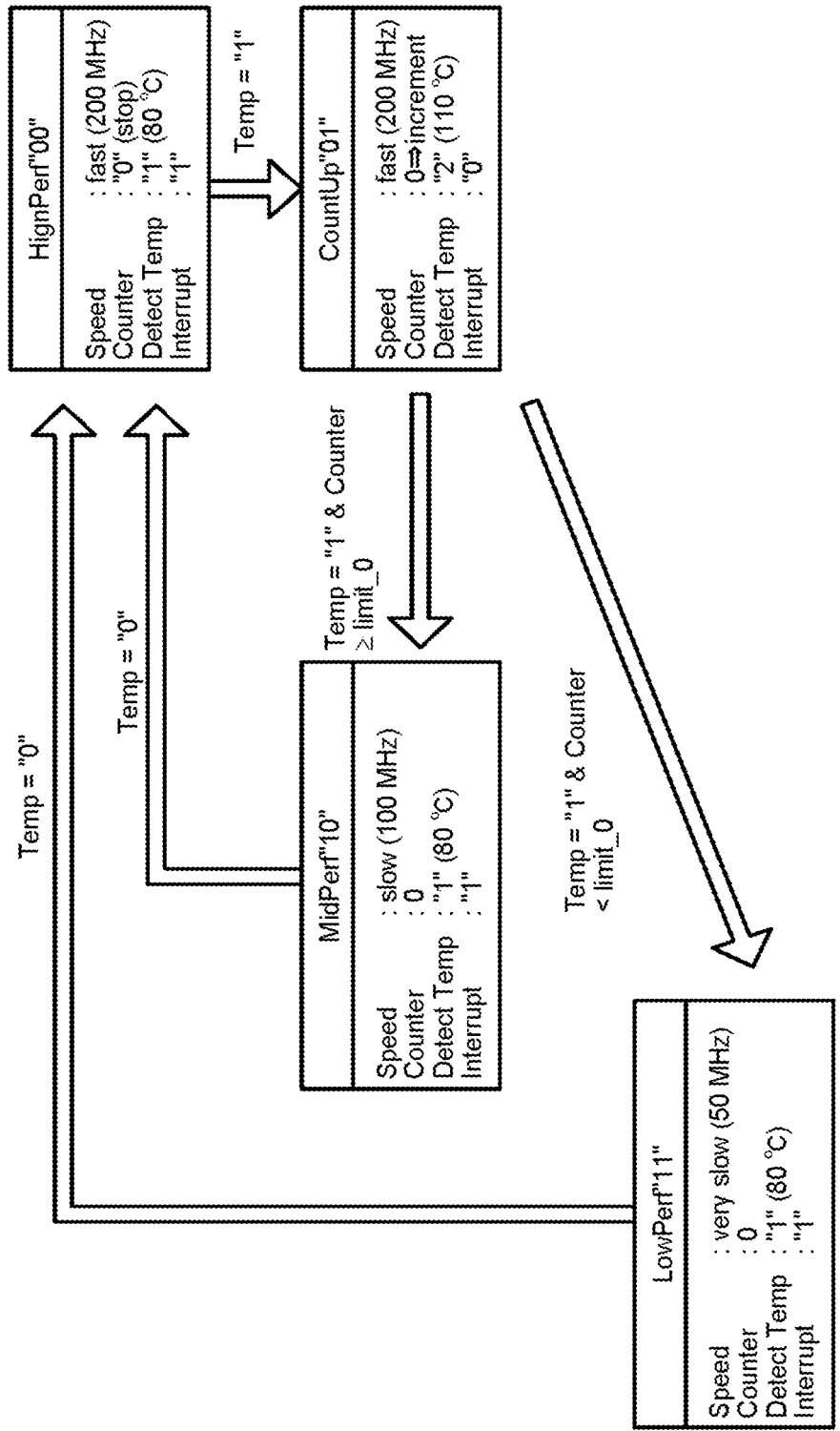
FIG. 5 is a diagram illustrating state transitions in a temperature control process of the memory device according to the first embodiment.

FIG. 5 is a diagram illustrating state transitions in a temperature control process of the memory device according to the first embodiment. In the following example, the high-power consumption mode is a high-speed operation mode at an operating frequency of 200 MHz (Speed="fast"), the mid-power consumption mode is a mid-speed operation mode at an operating frequency of 100 MHz (Speed="slow"), and the low-power consumption mode is a low-speed operation mode at an operating frequency of 50 MHz (Speed="very slow"). In addition, the preset temperature T1 (Detect Temp="1") is 80° C., and the preset temperature T2 (Detect Temp="2") is 110° C. At that time, the temperature detection circuit 10 can set one of two detection temperatures of 110° C. and 80° C., and as a result, release temperatures are set to one of two release temperatures of 95° C. and 65° C. respectively which are lower by 15° C. of hysteresis from the detection temperatures. A counter value X is 32 bits. In FIG. 5, the temperature with the high output level TDOUT is represented as Temp="1," the temperature with the low output level TDOUT is represented as Temp="0," the situation in which the count value X of the counter 11A is equal to or more than predetermined value limit_0 is represented as Counter≥limit_0, and the situation in which the count value X of the counter 11A is smaller than limit_0 is represented as Counter<limit_0. In addition, Interrupt indicates an interrupt output from the state machine 11B. At that time, the number "1" indicates that the interrupt input is output, and the number "0" indicates that no interrupt input is output. When Temp output from the temperature detection circuit 10 changes from "0" to "1," Interrupt changes to "1." With a change of state in the state machine 11B, Interrupt is reset from "1" to "0."

Referring to FIG. 5, state Y of the state machine 11B is defined as follows:

Y=00: High-speed operation mode (HighPerf)
  The operating frequency is 200 MHz.
  The temperature is lower than the lower detection temperature (80° C.).
  The detection temperature is set to the lower one (80° C.).
  The counter is stopped.
Y=01: Temperature monitoring mode (CountUp)
  The operating frequency is 200 MHz.
  The lower detection temperature (80° C.) is exceeded but the higher detection temperature (110° C.) is not yet reached.
  The detection temperature is set to the higher one (110° C.)
  The counter initializes the count value X to "0," and then starts count-up. When using up 32 bits, the counter holds "all 1" (0xffff_ffff).
Y=10: Mid-speed operation mode (MidPerf)
  It is determined that "temperature rise was less steep" in the temperature monitoring mode (Y=01).
  The operating frequency is switched to 100 MHz.
  The detection temperature is set to the lower one (80° C.).
  At that time, after the temperature has exceeded 110° C., the detection temperature is switched to the lower one (80° C.). Therefore, Temp="0" is set when the temperature becomes lower than 65° C. by 15° C. of hysteresis lower than the detection temperature of 80° C. Temp="1" is held when the temperature remains 65° C. or higher.
Y=11: Low-speed operation mode (LowPerf)
  It is determined that "temperature rise was steep" in the temperature monitoring mode (Y=01).
  The operating frequency is switched to 50 MHz.
  The detection temperature is set to the lower one (80° C.).
  At that time, since the detection temperature is switched to the lower one (80° C.) after the temperature has exceeded 110° C., Temp="0" is set when the detection temperature becomes lower than 65° C. by 15° C. of hysteresis lower than 80° C., and Temp="1" is held when the temperature is 65° C. or higher.

At the time of power-on, the state is set to Y=00. When Temp="1" is met, a state transition to Y=01 takes place. At that time, the detection temperature is switched form 80° C. to 110° C. When Temp="1" is met, a state transition to Y=10 takes place in the situation of Counter limit_0, and a state transition to Y=11 takes place in the situation of Counter<limit_0. Then, when Temp="0" is met in the situation of Y=10 or Y=11, a state transition to Y=00 takes place.

As described above, by adding the counter 11A and the state machine 11B as well as the simple temperature detection circuit 10 to the controller 2A, it is possible to switch the controller 2A to the operation mode according to the rate of temperature rise, and optimize system performance of the controller 2A while maintaining reliability of the controller 2A.

Figure 6:
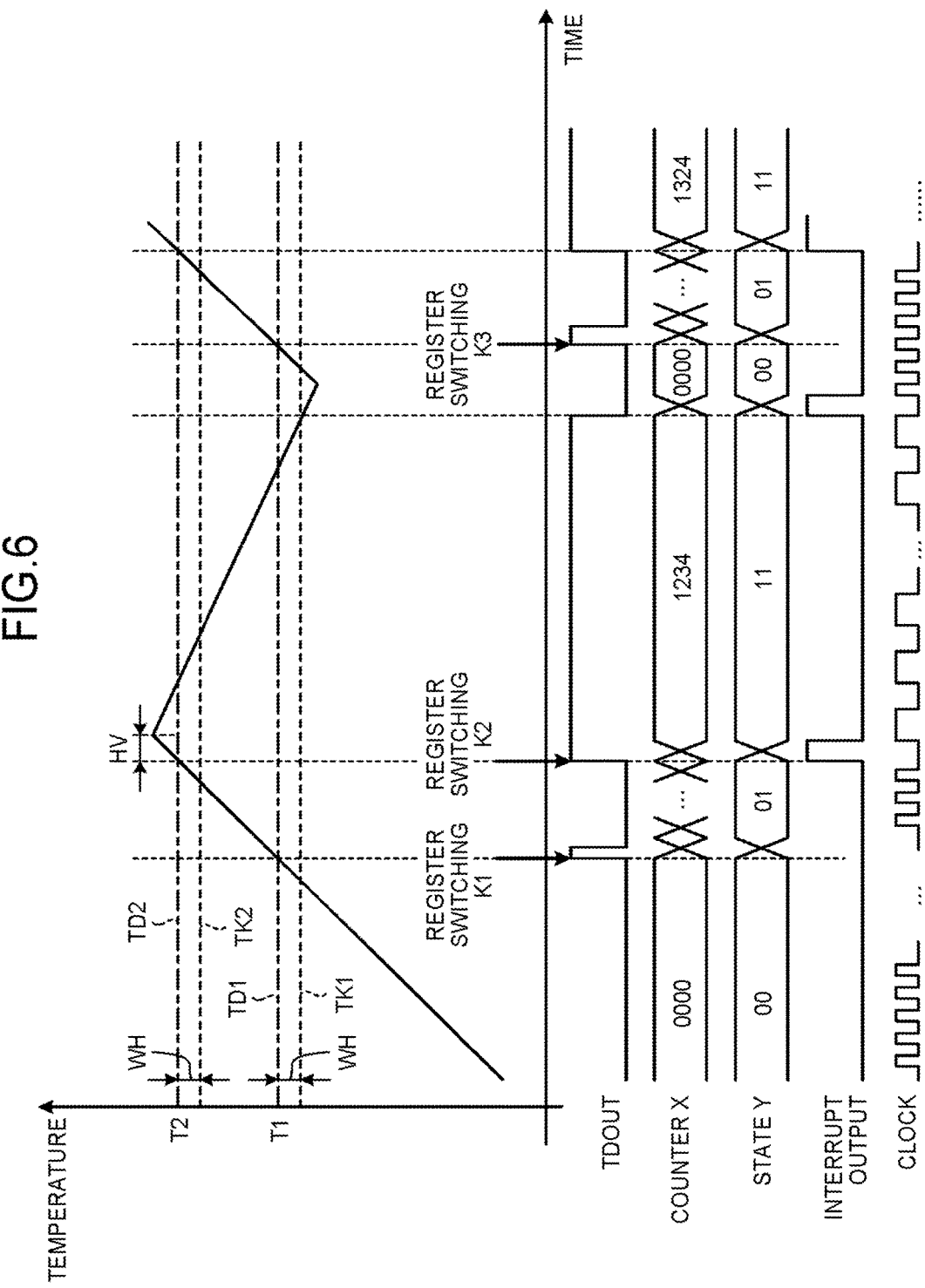
FIG. 6 is a timing chart of the temperature control process in the memory device according to the first embodiment.

FIG. 6 is a timing chart of the temperature control process in the memory device according to the first embodiment. FIG. 6 represents the case where transitions of the state Y in FIG. 5 take place from 00, through 01 and 11, to 00.

Referring to FIG. 6, the temperature detection circuit 10 exhibits hysteresis, and therefore has detection temperature TD1=80° C. and release temperature TK1=65° C. corresponding to the preset temperature T1=80° C., and detection temperature TD2=110° C. and release temperature TK2=95° C. corresponding to the preset temperature T2=110° C. As already mentioned, to simplify the temperature sensor, hysteresis width WH=15° C. is fixed. The preset temperature Detect Temp illustrated in FIG. 5 corresponds to a selector switch signal output from the temperature management unit 11 including the state machine/counter illustrated in FIG. 4 to the selector 7.

The state is set to Y=00 at the time of power-on. When the output level TDOUT is switched from low to high levels with temperature rise, a state transition to Y=01 takes place.

At that time, the counter 11A starts count-up of the count value X, and the detection temperature is switched from 80° C. to 110° C. by register switching K1. At the register switching K1, the selector 7 switches from the setting register 6A to the setting register 6B. When the detection temperature is switched from 80° C. to 110° C., the output level TDOUT is switched from high to low levels. Then, when the output level TDOUT is switched from low to high levels with further temperature rise, in the case where the counter value X<limit_0," a state transition to Y=11 takes place. At that time, the state machine 11B sends an interrupt input to the interrupt control circuit 12 which outputs an interrupt signal WA corresponding to the interrupt input to the CPU 5. Then, the CPU 5 accesses the state machine 11B to make reference to the state Y. When Y=11, the CPU 5 changes the clock frequency from 200 MHz to 50 MHz. In addition, the detection temperature is switched from 110° C. to 80° C. by register switching K2. When Y=11, even if the temperature of the memory device 2 becomes equal to or lower than the release temperature TK2, the output level TDOUT is maintained at high level. At the register switching K2, the selector 7 switches from the setting register 6B to the setting register 6A. Then, the temperature of the memory device 2 becomes equal to or lower than the release temperature TK1 and the output level TDOUT is switched from high to low levels, a state transition to Y=00 takes place. At that time, the state machine 11B sends an interrupt input to the interrupt control circuit 12 which outputs an interrupt signal WA corresponding to the interrupt input to the CPU 5. Then, the CPU 5 accesses the state machine 11B to make reference to the state Y. When Y=00, the CPU 5 changes the clock frequency from 50 MHz to 200 MHz. The CPU 5 also may output a reset signal to the counter 11A to reset the counter 11A.

When the clock frequency changes from 50 MHz to 200 MHz, the temperature of the memory device 2 rises. When the output level TDOUT is switched from low to high levels with the temperature rise, a state transition to Y=01 takes place. At that time, the counter 11A starts count-up of the count value X, and the detection temperature is switched from 80° C. to 110° C. by register switching K3. At the register switching K3, the selector 7 switches from the setting register 6A to the setting register 6B. When the detection temperature is switched from 80° C. to 110° C., the output level TDOUT is switched from high to low levels.

Even in the case where, when the temperature of the controller 2A has exceeded the preset temperature T2, the high-speed operation is switched to low-speed operations to reduce heat generation from the controller 2A, the temperature change of the controller 2A has an overhead HV, the temperature of the controller 2A does not become immediately lower than the preset temperature T2. Excessive temperature rise due to the overhead HV becomes larger when the temperature rise of the controller 2A is steep, and becomes smaller when the temperature rise of the controller 2A is less steep. Accordingly, it is possible to reduce temperature fluctuations of the controller 2A while suppressing variations in performance of the controller 2A by switching from high-speed to low-speed operations when the temperature rise of the controller 2A is steep and switching from high-speed to mid-speed operations when the temperature rise of the controller 2A is less steep.

Second Embodiment

Figure 7:
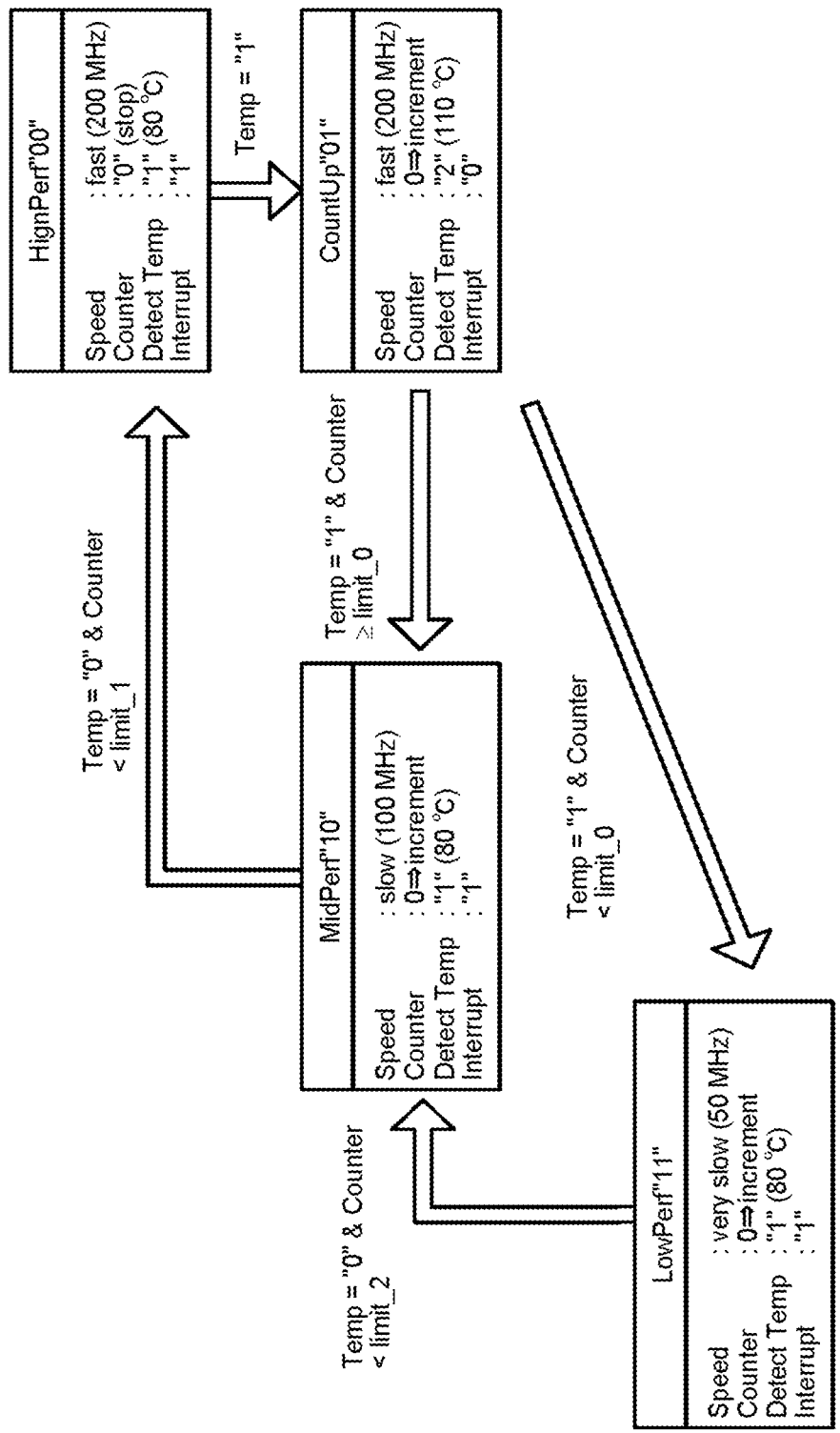
FIG. 7 is a diagram illustrating state transitions in a temperature control process of a memory device according to a second embodiment.

FIG. 7 is a diagram illustrating state transitions in a temperature control process of a memory device according to a second embodiment. In the embodiment of FIGS. 5 and 6, the rate of temperature rise of the memory device 2 is measured, and the operation mode is changed according to the rate of temperature rise. In the embodiment of FIGS. 7 to 10, the rate of temperature drop of the memory device 2 is measured as well as the rate of temperature rise of the same, and the operation mode is changed according to the rate of temperature rise and the rate of temperature drop.

Referring to FIG. 7, in the embodiment, the state Y is defined as in the case of FIG. 5. Then, after a state transition to Y=10 or Y=11 takes place, the counter 11A resets the count value X to "0" and then starts the count-up of the count value X. When the lower release temperature (65° C.) has been reached in the case of Y=10 or Y=11, Temp="0" is set. The count value X at Temp="0" is read, and when the count value X is equal to or less than the predetermined value, it is determined that the temperature drop was sufficiently fast and the operating frequency is shifted to a one-stage higher state.

When Temp="0" is detected at the time of Y=10, if the count value X is lower than limit_1 (0x0001_8000: about 0.983 ms), for example, the count value X is reset to effect a state transition to Y=00.

When Temp="0" is detected, if the count value X is equal to or more than limit_1 (0x0001_8000: about 0.983 ms), the state remains Y=10. When no Temp="0" is detected, the state remains Y=10. When the count value X exceeds limit_1, the counter 11A resets the count value X to "0" and then starts count-up, and the state remains Y=10.

When Temp="0" is detected at the time of Y=11, if the count value X is smaller than limit_2 (0x0000_C0000: about 0.983 ms), for example, the count value X is reset to effect a state transition to Y=10.

When the count value X is equal to or more than limit_2 (0x0000_C0000: about 0.983 ms), the state remains Y=11. When no Temp="0" is detected, the state remains Y=10. When the count value X exceeds limit_2, the counter 11A resets the count value X to "0" and then starts count-up of the count value X, and the state remains Y=11.

In the second embodiment, the state can be returned from Y=11 to Y=00 through Y=10, which makes it possible to reduce temperature variations at the time of a shift from the low-speed operation mode to the high-speed operation mode.

Third Embodiment

Figure 8:
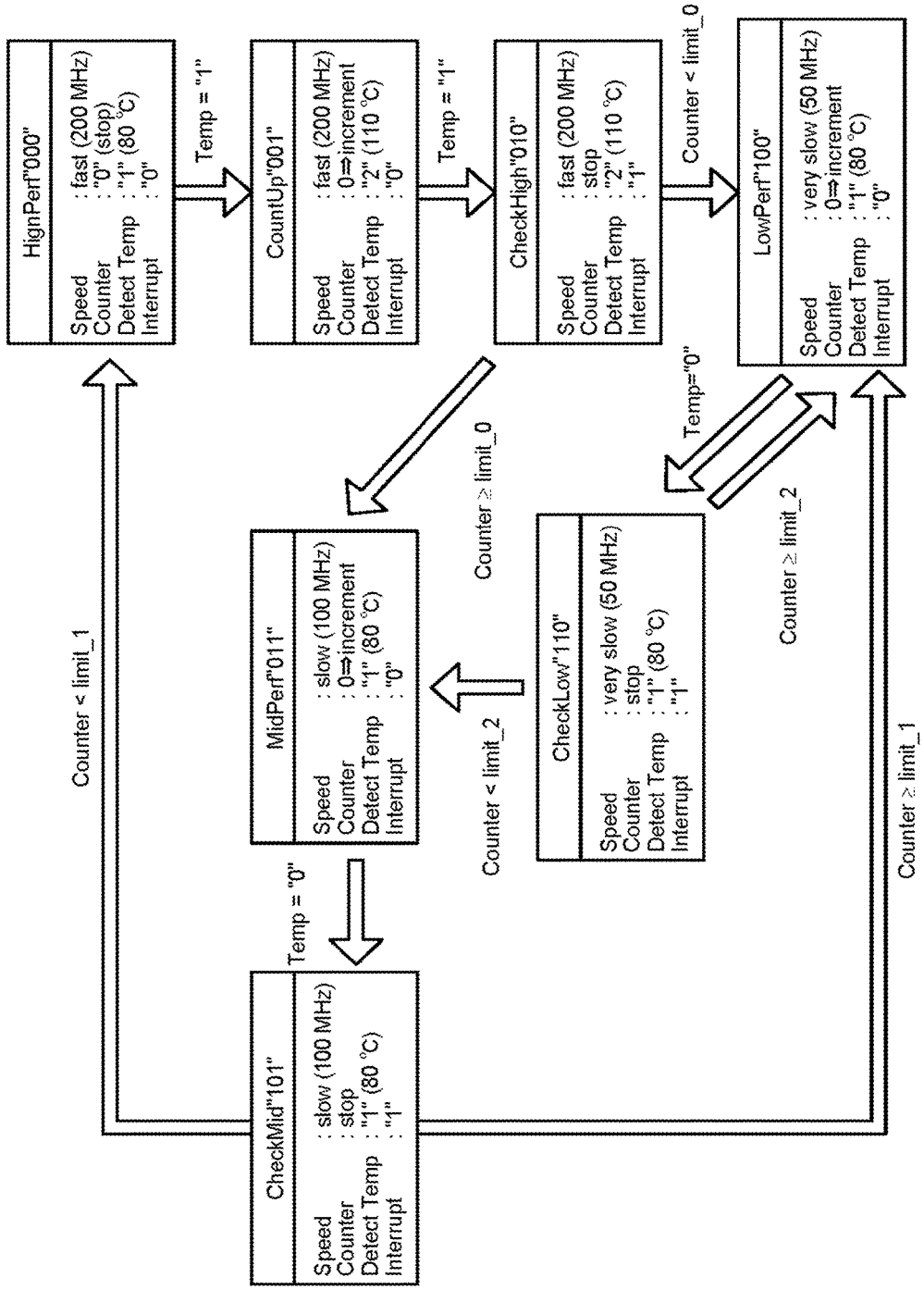
FIG. 8 is a diagram illustrating state transitions in a temperature control process of a memory device according to a third embodiment.

FIG. 8 is a diagram illustrating state transitions in a temperature control process of a memory device according to a third embodiment.

Referring to FIG. 8, the state Y of the state machine 11B will be defined as follows:

Y=000: High-speed operation mode (HighPerf)
The operating frequency is 200 MHz.
The temperature is lower than the lower detection temperature (80° C.).
The detection temperature is set to the lower one (80° C.).
The counter is stopped.

Y=001: Temperature monitoring mode (CountUp)
The operating frequency is 200 MHz.
The lower detection temperature (80° C.) is exceeded, but the higher detection temperature (110° C.) is not yet reached.
The detection temperature is set to the higher one (110° C.).
The counter initializes the counter value X to "0," and starts count-up. When using up 32 bit, the counter holds "all 1" (0xffff_ffff).

Y=010: High-speed check mode (CheckHigh)
   The operating frequency is 200 MHz.
   From the state of Y=001, the higher detection temperature (110° C.) is exceeded.
   The detection temperature remains set to the higher one (110° C.).
   The counter is stopped.
   The following operation mode is selected according to the count value:
Y=011: Mid-operation mode (MidPerf)
   The operating frequency is switched to 100 MHz.
   It is determined in the state of Y=001 that "temperature rise was less steep."
   The detection temperature is set to the lower one (80° C.).
   The counter resets the count value X to "0" and performs count-up.
Y=100: Low-speed operation mode (LowPerf)
   The operating frequency is switched to 50 MHz.
   It is determined in the temperature monitoring mode (state 001) that "temperature rise was steep."
   The detection temperature is set to the lower one (80° C.).
   The counter resets the counter value X to "0" and performs count-up.
Y=101: Mid-speed check mode (CheckMid)
   The operating frequency is 100 MHz.
   When Y=011, it is checked whether the temperature has dropped.
   The counter is stopped (holding limit_1)
Y=110: Low-speed check mode (CheckLow)
   The operating frequency is 50 MHz.
   When Y=011, the rate of temperature drop is checked.
   The counter remains stopped.

At the time of power-on, the state is set to Y=000. When Temp="1," a state transition to Y=001 takes place and the counter counts up. At that time, the detection temperature is switched from 80° C. to 110° C., and when Temp="1," a state transition to Y=010 takes place and the counter is stopped. Then, in the case of Counter limit_0 (for example, limit_0=0x0003_0000: about 0.983 ms), the temperature rise is less steep and a state transition to Y=011 takes place. In the case of Counter<limit_0, the temperature rise is steep and a state transition takes place to Y=100. When the state transition to Y=011 takes place, the counter counts up. When Temp="0," a state transition to Y=101 takes place and the counter is stopped. At that time, when Y=011, the detection temperature is switched to the lower one (80° C.) after the temperature has exceeded 110° C. Accordingly, when the detection temperature becomes lower than 65° C. (release temperature) by 15° C. from the detection temperature of 80° C., Temp="0" is reached and a state transition to Y=101 takes place. When the temperature is equal to or higher than 65° C., the temperature remains Temp="1" and the state continues to be Y=011. Then, when Y=101, in the case of Counter≥limit_1, a state transition to Y=100 takes place. In the case of Counter<limit_0, a state transition to Y=000 takes place. When the state transition to Y=100 takes place, the detection temperature is switched from to 110° C. to 80° C., and the counter counts up. At that time, when Y=100, the detection temperature is switched to the lower one (80° C.) after the temperature has exceeded 110° C. Therefore, when the temperature becomes lower than 65° C. (release temperature) by 15° C. lower than the detection temperature of 80° C., Temp="0" is reached and a state transition to Y=110 takes place. When the temperature is equal to or higher than 65° C., the temperature remains Temp="1" and the state continues to be Y=100. In the state of Y=100, when Temp="0," a state transition to Y=110 takes place and the counter is stopped. In the state of Y=110, when Counter<limit_2, a state transition to Y=011 takes place. In the case of Counter limit_2, a state transition to Y=100 takes place.

By shifting the operation mode according to not only the temperature of the controller 2A but also the rate of temperature rise and the rate of temperature drop, it is possible to realize finer temperature control at the time of return to the high-speed operation mode, and reduce variations in performance due to temperature fluctuations.

Figure 9:
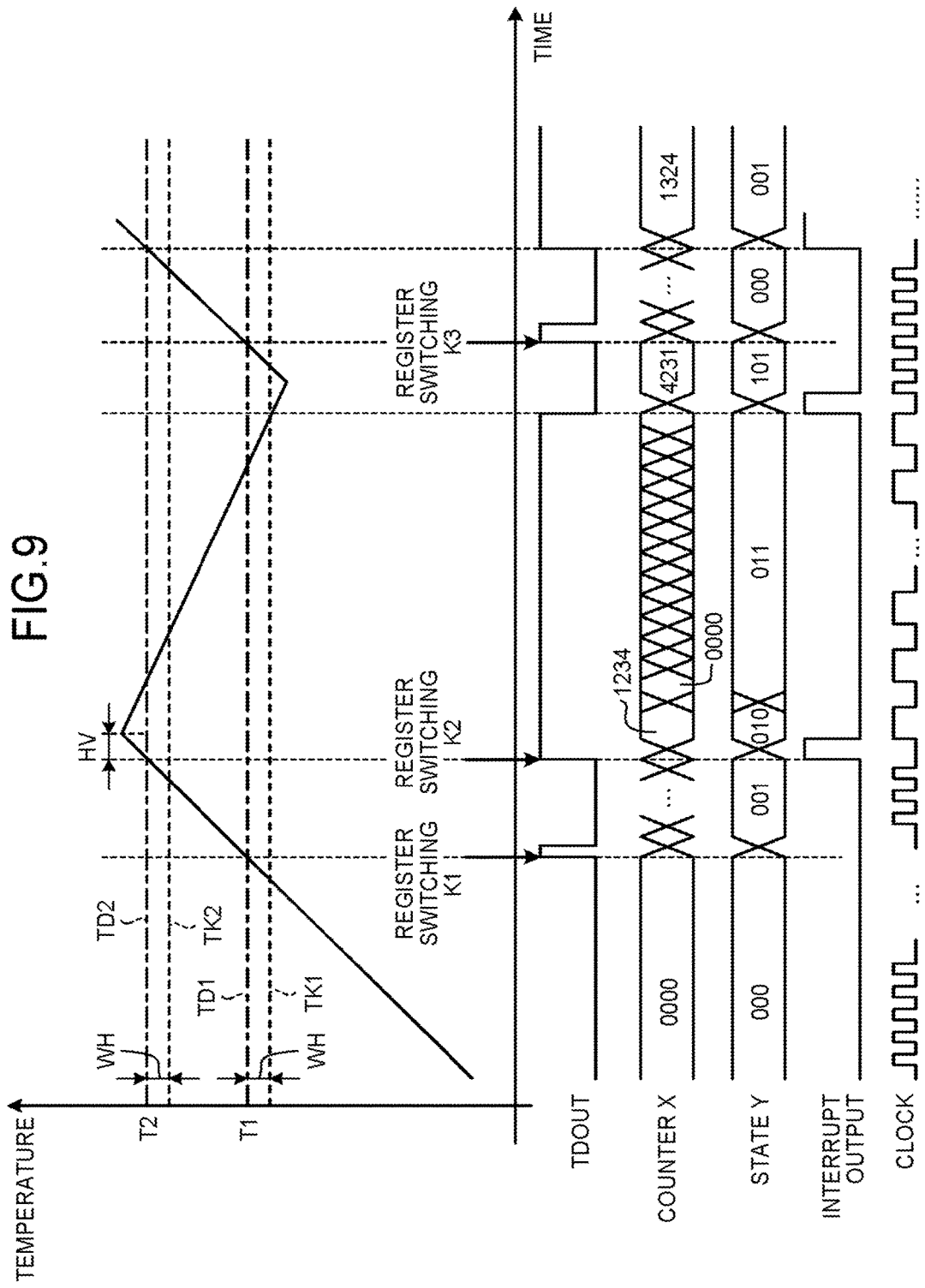
FIG. 9 is a timing chart of a temperature control process of the memory device according to the third embodiment.

FIG. 9 is a timing chart of a temperature control process of the memory device according to the third embodiment. In the example of FIG. 9, the state Y in FIG. 8 makes transitions from 000 through 001, 010, 011, and 101, to 000.

Referring to FIG. 9, the state is set to Y=000 at the time of power-on. When the output level TDOUT is switched from low to high levels with temperature rise, a state transition to Y=001 takes place. At that time, the counter 11A starts to count up the count value X and the detection temperature is switched from 80° C. to 110° C. When the detection temperature is switched from 80° C. to 110° C., the output level TDOUT is switched from high to low levels. Then, when the output level TDOUT is switched from low to high levels with further temperature rise, a state transition to Y=010 takes place and the counter 11A is stopped. Then, when Y=010, in the case of Counter 2 limit_0, a state transition to Y=011 takes place. When Y=010, the state machine 11B sends an interrupt input to the interrupt control circuit 12 which outputs an interrupt signal WA corresponding to the interrupt input to the CPU 5. Then, the CPU 5 accesses the state machine 11B to make reference to the state Y and changes the clock frequency from 200 MHz to 100 MHz at the time of Y=011. When the state transition to Y=011 takes place, the counter 11A stars to count up the count value X. Then, when the output level TDOUT is switched from high to low levels with temperature drop, a state transition to Y=101 takes place. When Y=101, in the case of Counter<limit_1, a state transition to Y=000 takes place. When the state transition to Y=000 takes place, the state machine 11B sends an interrupt input to the interrupt control circuit 12 which outputs an interrupt signal WA corresponding to the interrupt input to the CPU 5. Then, the CPU 5 accesses the state machine 11B to make reference to the state Y, and changes the clock frequency from 100 MHz to 200 MHz.

Fourth Embodiment

Figure 10:
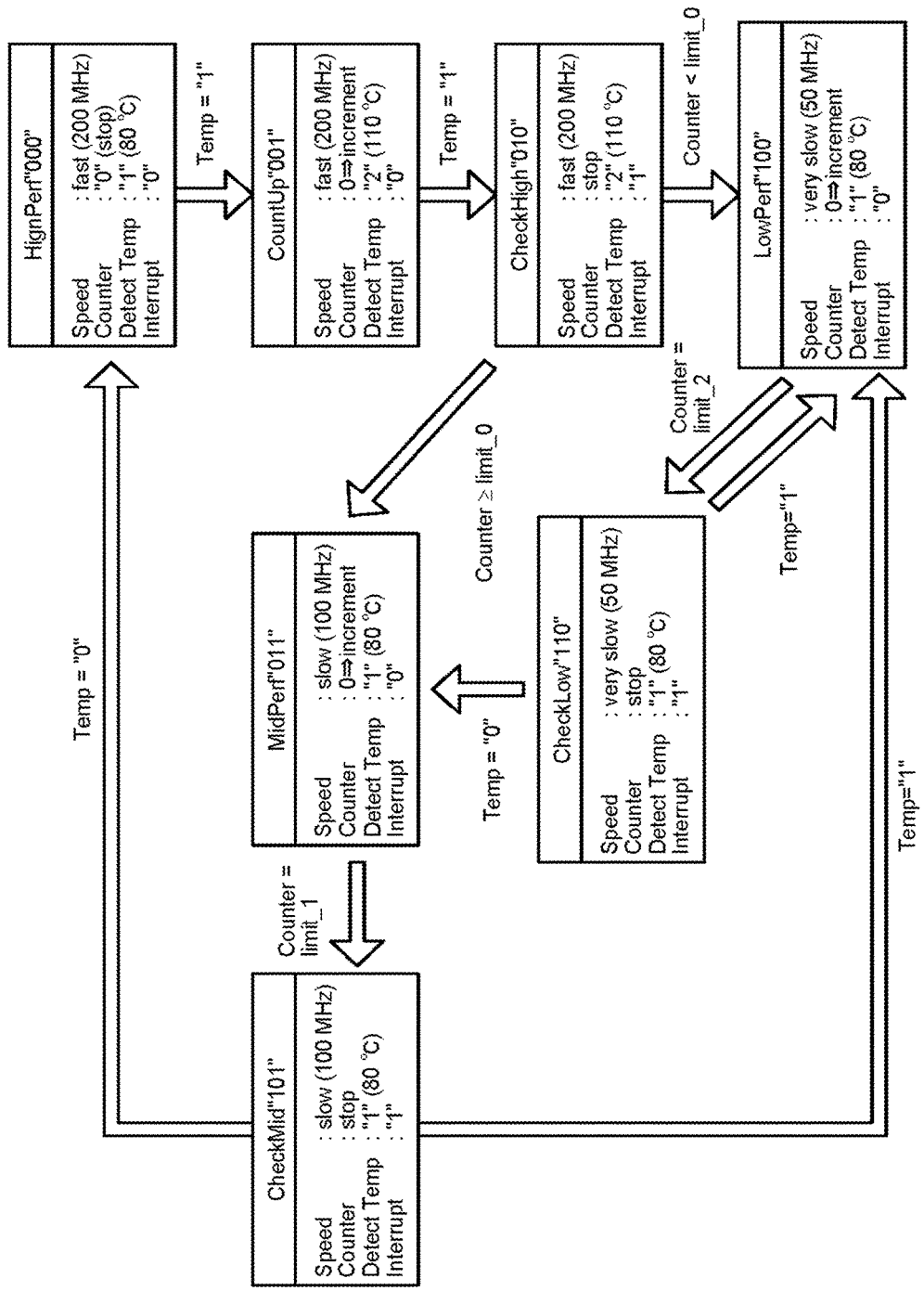
FIG. 10 is a diagram illustrating state transitions in a temperature control process of a memory device according to a fourth embodiment.

FIG. 10 is a diagram illustrating state transitions in a temperature control process of a memory device according to a fourth embodiment.

Referring to FIG. 10, in the fourth embodiment, the state Y of the state machine 11B is defined as in the third embodiment, except that conditions for transitions in the state Y are different.

Specifically, the state is set to Y=000 at the time of power-on. When Temp="1," a state transition to Y=001 takes place and the counter counts up. At that time, the detection temperature is switched from 80° C. to 110° C., and when Temp="1," a state transition to Y=010 takes place and the counter is stopped. Then, in the case of Counter limit_0, a state transition to Y=011 takes place. In the case of "Counter<limit_0," a state transition to Y=100 takes place. When the state transition to Y=011 takes place, the counter counts up. When Counter=limit_1, a state transition to Y=101 takes place and the counter is stopped. Then, when Y=101, in the case of Temp="1," a state transition to Y=100 takes place. In the case of Temp="0," a state transition to Y=000 takes place. When the state transition to Y=100 takes place, the detection temperature is switched from 110° C. to 80° C. and the counter counts up. When Y=100, in the case of Counter=limit_2, a state transition to Y=110 takes place and the counter is stopped. When Y=110, in the case of Temp="0," a state transition to Y=011 takes place. In the case of Temp="1," a state transition to Y=100 takes place.

In the embodiment described above, the temperature detection circuit 10 exhibits hysteresis and thus the detection temperature and the release temperature are different relative to the preset temperatures T1 and T2. Alternatively, the temperature detection circuit 10 may not exhibit hysteresis. In this case, the detection temperature and the release temperature may be equal relative to the preset temperatures T1 and T2. When the temperature detection circuit 10 exhibits no hysteresis, the hysteresis circuit 22 illustrated in FIG. 2 is not required, which makes it possible to scale down the temperature detection circuit 10. In addition, the setting registers 6A and 6B illustrated in FIG. 1 may be provided with two setting registers for detection temperature and two setting registers for release temperature. This makes it possible to change freely a difference SB1 between the detection temperature and the release temperature relative to the preset temperature T1 and a difference SB2 between the detection temperature and the release temperature relative to the preset temperature T2, and allow the differences SB1 and SB2 to be different from each other. Accordingly, it is possible to set the temperatures for switching between the power consumption modes independently and freely at the time of temperature rise and the time of temperature drop, thereby to allow finer temperature control of the controller 2A. In addition, in the embodiment described above, the preset temperature is changed in two stages and the state is changed according to the rate of temperature change, and the power consumption mode is changed according to the state. Alternatively, the preset temperature may be changed in three or more stages to change the state according to the rate of temperature change in each of the stages, and the power consumption mode may be changed according to the state.

Fifth Embodiment

Figure 11:
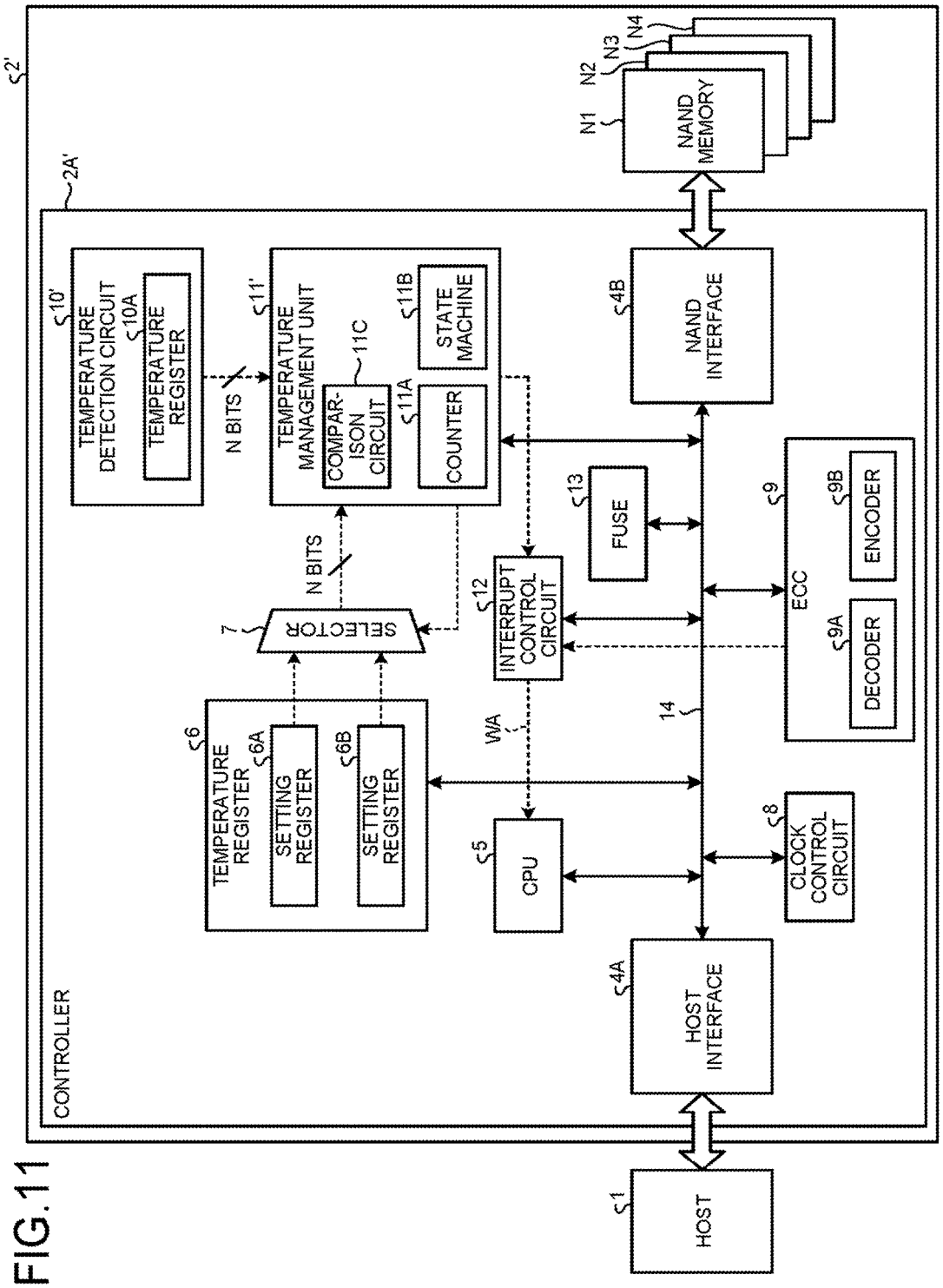
FIG. 11 is a block diagram of a system configuration of a memory device according to a fifth embodiment.

FIG. 11 is a block diagram of a system configuration of a memory device according to a fifth embodiment.

Referring to FIG. 11, in the system configuration, a memory device 2' is provided instead of the memory device 2 illustrated in FIG. 1. The memory device 2' is provided with a controller 2A' instead of the controller 2A. The controller 2A' is provided with a temperature detection circuit 10' and a temperature management unit 11' instead of the temperature detection circuit 10 and the temperature management unit 11. The temperature management unit 11' is formed by adding a comparison circuit 11C to the temperature management unit 11. The temperature detection circuit 10' is configured to measure the temperature of the controller 2A' and output the measured temperature by an N-bit numerical value. The temperature detection circuit 10' is provided with a temperature register 10A to store the temperature. For example, the temperature detection circuit 10' may indicate 0 to 127° C. by 7-bit values, as illustrated in FIG. 12. In the case of 0° C., the temperature register 10A may indicate the value as 000_0000 and increment the value by one at each rise of 1° C., and express the value by a binary number. For example, 25° C. can be expressed as 001_1001 in binary. The temperature of −127° C. can be expressed as 000_0000, and the temperature of 127° C. or more can be expressed as 111_1111. At that time, the temperature detection circuit 10' may exhibit no hysteresis. The comparison circuit 11C may compare the preset temperature T1 or T2 selected by the selector 7 with the temperature measured by the temperature detection circuit 10', and output the comparison result to the state machine 11B. At that time, when the preset temperature T1 is selected, if the temperature measured by the temperature detection circuit 10' is equal to or higher than the preset temperature T1, the output of the comparison circuit 11C may be at high level, and if the temperature measured by the temperature detection circuit 10' is lower than the preset temperature T1, the output of the comparison circuit 11C may be at low level. When the preset temperature T2 is selected, if the temperature measured by the temperature detection circuit 10' is equal to or higher than the preset temperature T2, the output of the comparison circuit 11C may be at high level, and if the temperature measured by the temperature detection circuit 10' is lower than the preset temperature T2, the output of the comparison circuit 11C may be at low level. In this case, the counter 11A and the state machine 11B may operate in the same manner as in the configuration of FIG. 1, corresponding to the output level of the comparison circuit 11C.

Figure 13:
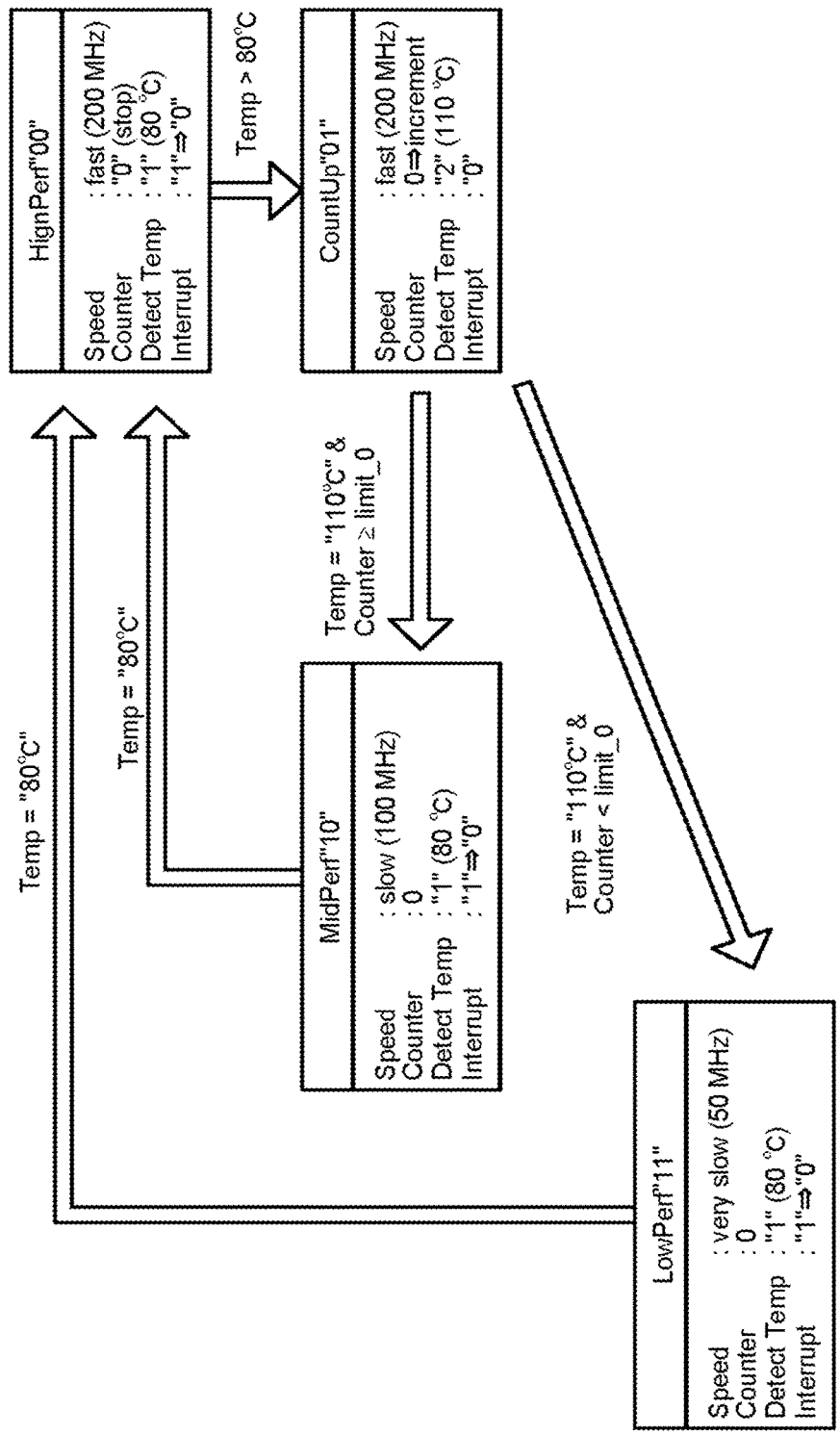
FIG. 13 is a diagram illustrating state transitions in a temperature control process of the memory device according to the fifth embodiment.

FIG. 13 is a diagram illustrating state transitions in a temperature control process of the memory device according to the fifth embodiment.

Referring to FIG. 13, in the fifth embodiment, the state Y of the state machine 11B is defined as in the first embodiment, except that, in the first embodiment, the conditions for transitions in the state Y are set according to the output level TDOUT corresponding to the preset temperatures T1 and T2, whereas in the fifth embodiment, the conditions for transitions in the state Y are set according to the values of temperatures. In the example of FIG. 13, Temp="0" in FIG. 5 is changed to Temp="80° C.," and Temp="1" in FIG. 5 is changed to Temp="110° C."

Specifically, the state is set to Y=00 at the time of power-on. When Temp>80° C., a state transition to Y=01 takes place. At that time, the detection temperature is switched form 80° C. to 110° C. When Temp="110° C.," in the case of Counter limit_0, a state transition to Y=10 takes place, and in the case of Counter<limit_0, a state transition to Y=11 takes place. Then, when Y=10 or Y=11, in the case of Temp="80° C.," a state transition to Y=00 takes place.

Sixth Embodiment

Figure 14:
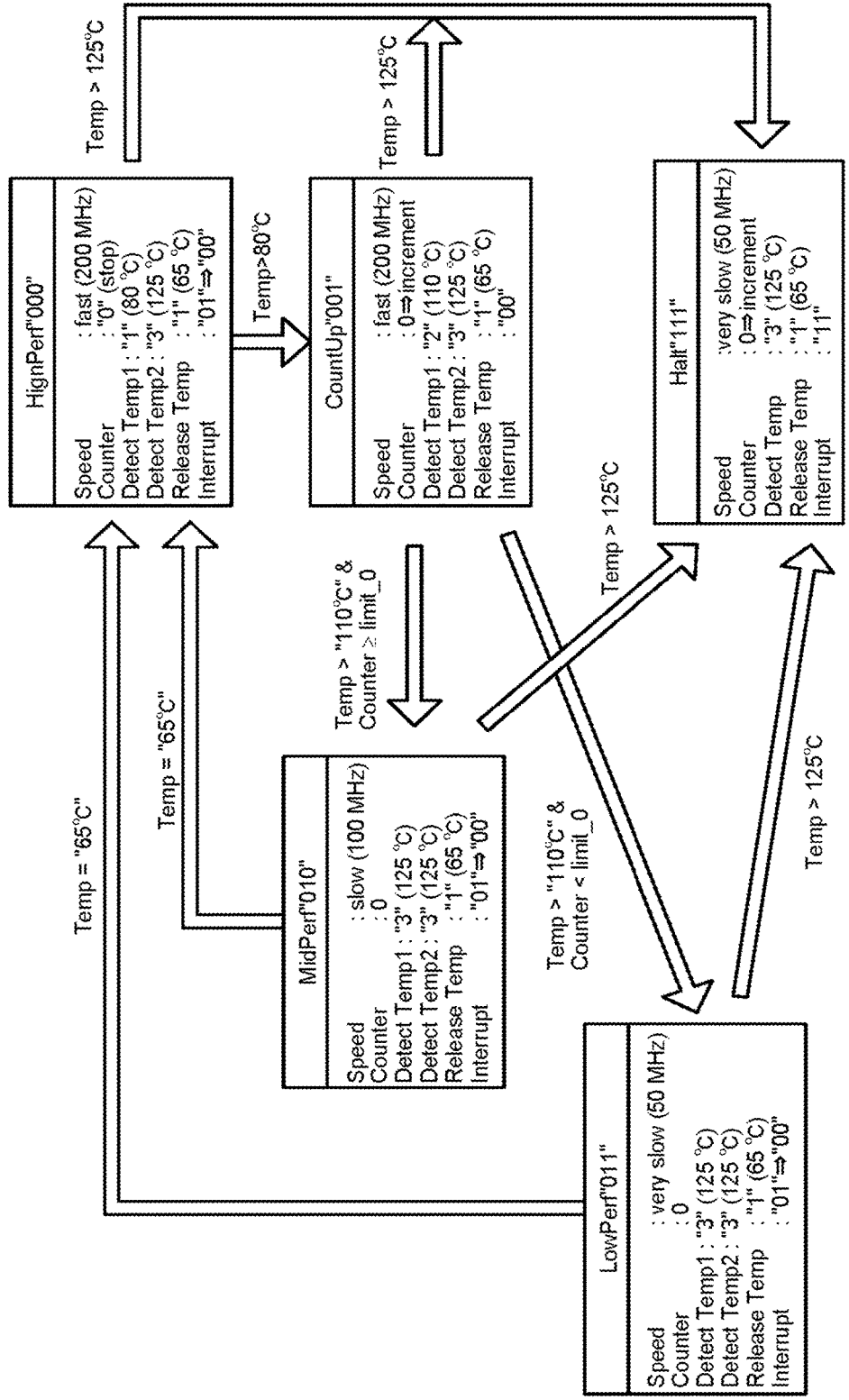
FIG. 14 is a diagram illustrating state transitions in a temperature control process of a memory device according to a sixth embodiment.

FIG. 14 is a diagram illustrating state transitions in a temperature control process of a memory device according to a sixth embodiment. In the sixth embodiment, a halt state (Y=111) is added in which the controller 2A is halted upon detection of an abnormal temperature. To add the halt state (Y=111), the number of bits in the state is increased to 3 bits from 2 bits illustrated in FIG. 14. When a transition to the halt state takes place, the controller 2A stops access to the NAND memories N1 to N4, and therefore operations of components other than the host interface 4A and the CPU 5 necessary for accessing from the host 1 are stopped. In the example of FIG. 14, the abnormal temperature is 125° C. Then, in all of the states described in FIG. 14, Detect Temp2 indicating that the abnormal temperature is 125° C. is set, and Release Temp as a temperature at which to return to the initial state is set. In the example of FIG. 14, Release Temp is 65° C. Detect Temp1 may be set in the same manner as Detect Temp described in FIG. 13. In any of the states, when Temp>125° C., a transition to the halt state takes place.

Specifically, the state is set to Y=000 at the time of power-on. When Temp>80° C., a state transition to Y=001 takes place. At that time, the detection temperature is switched from 80° C. to 110° C. When Temp>"110° C.," in the case of Counter≥limit_0, a state transition to Y=010 takes place. In the case of Counter<limit_0, a state transition to Y=011 takes place. Then, when Y=10 or Y=11, in the case of Temp="65° C.," a state transition to Y=100 takes place. When Y=000, Y=001, Y=010, and Y=011, in the case of Temp>125° C., a state transition to Y=111 takes place.

Seventh Embodiment

FIG. 15 is a diagram illustrating state transitions in a temperature control process of a memory device according to a seventh embodiment.

Referring to FIG. 15, in the seventh embodiment, the state Y of the state machine 11B is defined as in the fifth embodiment, except that, in the fifth embodiment, when Y=01, the counter 11A counts up from 0, and when the temperature reaches 110° C., a state transition to Y=10 or Y=11 takes place according to the value of the counter 11A, whereas, in the seventh embodiment, when Y=01, the counter 11A counts down from a predetermined value, and a state transition Y=10 or Y=11 takes place depending on whether the value of the counter 11A reaches 110° C. when the value of the counter 11A reaches 0.

Specifically, the state is set to Y=00 at the time of power-on. When Temp>80° C., a state transition to Y=01 takes place. At that time, the detection temperature is switched from 80° C. to 110° C. and the counter 11A counts down from limit_0. Then, when Counter=0, in the case of Temp<110° C., a state transition to Y=10 takes place. When Counter=0, in the case of Temp>110° C., a state transition to Y=11 takes place. Then, when Y=10 or Y=11, in the case of Temp="80° C.," a state transition to Y=00 takes place.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor device, comprising:
    an integrated circuit that has a plurality of power consumption modes different in power consumption;
    a temperature detection circuit that detects temperature of the integrated circuit;
    a counter that measures time taken for temperature change in the integrated circuit;
    a state machine that causes a state transition to take place in the integrated circuit based on the temperature detected by the temperature detection circuit and the time measured by the counter; and
    registers that switch between setting temperatures, wherein the integrated circuit selects the power consumption mode based on the state subjected to transition by the state machine, wherein
    the temperature detection circuit switches between output levels when the setting temperature has been reached, wherein
    the temperature detection circuit includes:
        a variable resistor that sets a reference voltage;
        a diode with temperature property; and
        a comparator that compares output of the diode with the reference voltage, and wherein
    resistance value of the variable resistor is changed based on the setting temperature in the register.

2. The semiconductor device of claim 1, wherein
    the integrated circuit includes a CPU, and
    upon receipt of an interrupt signal according to state of the state machine, the CPU makes reference to the state of the state machine or count value of the counter to switch between the power consumption modes.

3. The semiconductor device of claim 1, wherein
    as the setting temperatures of the registers, a first setting temperature and a second setting temperature higher than the first setting temperature are given,
    as the power consumption modes of the integrated circuit, a first mode, a second mode lower in power consumption than the first mode, and a third mode lower in power consumption than the second mode are given,
    when the first setting temperature has been reached during operation in the first mode, the counter is operated,
    in the case where the value of the counter is equal to or larger than a first predetermined value when the second setting temperature has been reached, the first mode is shifted to the second mode, and
    in the case where the value of the counter is smaller than the first predetermined value when the second setting temperature has been reached, the first mode is shifted to the third mode.

4. The semiconductor device of claim 3, wherein
    when the second setting temperature has been reached during operation in the third mode, the counter is operated,
    in the case where the temperature is equal to or higher than the first setting temperature when the value of the counter has reached a second predetermined value, the third mode is continued, and
    in the case where the temperature is lower than the first setting temperature when the value of the counter has reached the second predetermined value, the third mode is shifted to the second mode.

5. The semiconductor device of claim 3, wherein
    when the second setting temperature has been reached during operation in the second mode, the counter is operated,
    in the case where the value of the counter is equal to or higher than a third predetermined value when the first setting temperature has been reached, the second mode is shifted to the first mode, and
    in the case where the value of the counter is lower than the third predetermined value when the first setting temperature has been reached, the second mode is continued.

6. The semiconductor device of claim 1, wherein the temperature detection circuit outputs a numerical value corresponding to the temperature of the integrated circuit.

7. The semiconductor device of claim 6, wherein
    as thresholds for the temperature, a first threshold and a second threshold higher than the first threshold are given,
    as the power consumption modes of the integrated circuit, a first mode, a second mode lower in power consumption than the first mode, and a third mode lower in power consumption than the second mode are given, when the temperature has reached the first threshold during operation in the first mode, the counter is operated, in the case where the value of the counter is equal to or larger than a first predetermined value when the temperature has reached the second threshold, the first mode is shifted to the second mode, and in the case where the value of the counter is smaller than the first predetermined value when the temperature has reached the second threshold, the first mode is shifted to the third mode.

8. The semiconductor device of claim 6, wherein as thresholds for the temperature, a first threshold and a second threshold higher than the first threshold are given, as the power consumption modes of the integrated circuit, a first mode, a second mode lower in power consumption than the first mode, and a third mode lower in power consumption than the second mode are given, when the temperature has reached the first threshold during operation in the first mode, the counter counts down from an initial value, in the case where the temperature is lower than the second threshold when the value of the counter has reached zero, the first mode is shifted to the second mode, and in the case where the temperature is equal to or higher than the second threshold when the value of the counter has reached zero, the first mode is shifted to the third mode.

* * * * *